United States Patent [19]
Grafwallner et al.

[11] Patent Number: 5,660,358
[45] Date of Patent: Aug. 26, 1997

[54] FUEL SUPPLY SYSTEM

[75] Inventors: Franz Grafwallner, Tegernsee; Peter Luger, Höhenkirchen-Siegertsbrunn; Helmuth Peller, Höhenkirchen-Siegertsbrunn; Martin Müller, Höhenkirchen-Siegertsbrunn, all of Germany; Valentin V. Malyshev, Moscow, Russian Federation; Sergei B. Galperin, Moscow, Russian Federation; Igor V. Golov, Moscow, Russian Federation

[73] Assignees: Daimler-Benz Aerospace AG, Munich, Germany; Tupolev AG, Moscow, Russian Federation

[21] Appl. No.: 395,677

[22] Filed: Feb. 28, 1995

[30] Foreign Application Priority Data

Mar. 2, 1994 [RU] Russian Federation ............. 94007124

[51] Int. Cl.$^6$ .................... B64D 37/00; B64D 37/04; B64D 37/30; F17D 1/02
[52] U.S. Cl. .................... 244/135 R; 244/135 C; 137/566; 137/572
[58] Field of Search ............. 244/135 R, 135 C; 137/566, 571, 572

[56] References Cited

U.S. PATENT DOCUMENTS

| | | | |
|---|---|---|---|
| 2,356,786 | 8/1944 | Harman et al. | 244/134 C |
| 2,575,923 | 11/1951 | McMahan et al. | |
| 3,591,962 | 7/1971 | Connell | 60/36 |
| 3,693,915 | 9/1972 | Ulanovsky | 244/135 R |
| 3,982,399 | 9/1976 | Rookey | 244/135 C |
| 4,141,701 | 2/1979 | Ewan et al. | 55/90 |
| 4,591,115 | 5/1986 | DeCarlo | 244/135 C |
| 4,932,609 | 6/1990 | Secchiaroli et al. | 244/135 C |
| 5,321,945 | 6/1994 | Bell | 244/135 |

FOREIGN PATENT DOCUMENTS

| | | | |
|---|---|---|---|
| 2623774 | 6/1989 | France | 244/135 C |

OTHER PUBLICATIONS

Jeffrey M. Lenorovitz, Aug. 9, 1982, Airbus A310–300 Definition Completed, Aviation Week & Space Technology, Translation.

W. Steinebach, 1964, Luftfahrtzubehör, Bei Ablage in DIN A 4–Ordner hier abschneiden, No Translation.

Herrn Krabel, Jul. 15, 1969, Design Considerations of the DC–8 Fuel System, Dornier GmbH Druckschrift "The SAE Journal", No Translation.

Hawker Siddeley, Jan. 1970, Powerplant: Fuel System, Aircraft Engineering, Translation.

*Primary Examiner*—Andres Kashnikow
*Assistant Examiner*—Virna Mojica
*Attorney, Agent, or Firm*—McGlew and Tuttle

[57] ABSTRACT

Fuel supply system for multijet airplanes using cryogenic fuel with one tank or one tank group for each engine or for all engines on one side of the longitudinal central plane of the airplane, and, if desired, with an additional, common tank or an additional, common tank group for all engines. A transfer line with shut-off valve leads from each tank/tank group associated with a defined engine or with the engines of one side of the airplane to at least one other tank/tank group and/or, if desired, to the tank/tank group common to all engines. If desired, at least one transfer line leads from the common tank/tank group to at least one other tank/tank group.

8 Claims, 3 Drawing Sheets

FUEL SUPPLY SYSTEM

FIELD OF THE INVENTION

The present invention pertains to a fuel supply system for multijet airplanes using cryogenic fuel, particularly using cryogenic hydrogen, wherein a line system with the necessary pumps and valves, and a tank or tank group is provided for each engine or for all engines on one side of a longitudinal plane of the airplane and possibly with an additional common tank or an additional common tank group for all engines.

BACKGROUND OF THE INVENTION

Numerous designs of fuel supply systems for multijet airplanes have been known. For example, the twin-jet Airbus A 310 has five tanks, namely, one inner wing tank and one outer wing tank on each side, as well as a middle tank in the area in which the airplane wing passes through the fuselage. The two left-hand wing tanks are used exclusively to supply the left-hand engine during normal flight operation, and the right-hand fuel tank is correspondingly used exclusively for the right-hand engine. Both engines can be supplied with fuel (kerosene) from the middle tank. Fuel transfer from tank to tank is not provided for. To make it possible to use the fuel present in the wing tank of an engine that fails for the remaining, intact engine, there is a line connection between the left-hand side and the right-hand side of the airplane with a shut-off valve that opens in the case of an emergency. This valve is called a transfer valve, a cross-feed valve or crossover valve, etc. Thus, it makes possible a direct fuel feed from the wing tanks of one side to the engine on the other side of the airplane.

The arrangement of the tanks of the four-jet Airbus A 340 is comparable to that of the A 310, but there is an additional trimming tank in the horizontal tail unit, which is or can be connected to the middle tank. There are differences inasmuch as both engines of one side are supplied basically from the inner wing tank, which again are or can be connected to the outer wing tank. However, the "crossover" principle is put into practice here as well, i.e., there is a connection between the wing tanks of one side and the engines of the other side of the airplane, which is to be opened in the case of an emergency.

In airplanes flying on cryogenic fuel, the fuel is stored in the cryogenic and liquid state in the heat-insulated tanks of the airplane. During normal flight operation, the fuel is fed to the engines as a cryogenic liquid, and the line system with its installed parts assumes approximately the temperature of the fuel.

In contrast, phases of operation during which the line system or parts thereof are still approximately at the ambient temperature, i.e., they are relatively "warm," are problematic. This happens, e.g., during the start phase of the engines, as well as during flight in fuel-filled, inactive line sections or elements, i.e., line sections or elements through which no fuel flows. Intense evaporation of the fuel, leading to great variations in pressure and flow, develops in the warm line elements at the beginning of flow. This in turn leads to an uneven, unreliable fuel flow, and in extreme cases even to a stalling of the engines.

The same effects would occur when the operation is switched over to "crossover" operation as a consequence of the failure of an engine or of a line damage. If the "crossover valve," which is at ambient temperature, and the line elements belonging to it came into contact with the liquid fuel, intense evaporation would occur here as well, so that partially gaseous, partially liquid fuel under greatly varying pressure and in greatly varying amounts would reach the running engine or the running engines.

This would lead at least to a highly erratic operation of the engine, and the intact engine or the intact engines could even fail in the worst case.

In the case of a damage to the "crossover" valve, which leads to leakage, the fuel supply of the still intact engines from their own tanks would be jeopardized as well.

SUMMARY AND OBJECTS OF THE INVENTION

In contrast to this, the primary object of the present invention is to avoid the above-described disadvantages and therefore to increase especially the reliability of Operation.

According to the invention, a fuel supply system is provided for multijet airplanes using cryogenic fuel, especially cryogenic hydrogen. The fuel supply system includes a line system with necessary pumps and vanes and a tank or tank group for each engine or for all engines on one side of a longitudinal central plane of the airplane. A similar tank or group of tanks is provided for engines on the opposite side. Possibly, an additional common tank or an additional common tank group is provided for all engines. At least one transfer line is provided with a shut-off valve which leads from each tank associated with a defined engine or associated with a defined side of the airplane to at least one other tank associated with a different defined engine or associated with engines on another side of the airplane. Additionally, if desired, the transfer line also leads to the tank which is common to all engines or the tank which is common to all sides. At least one additional transfer line with a shut-off valve leads from the tank common to all engines to at least one tank associated with the other side (or with a defined engine on the other side of the airplane or with the tank on the other side of the airplane). Tank groups may also be provided, namely a tank group supplying engines on a one side of the airplane as well as tank groups supplying an engine or engines on the other side of the airplane as well as a tank or tank group supplying both sides (engines on both sides of the airplane).

Consequently, the present invention abandons the "crossover" principle with respect to the properties of cryogenic liquids, and suggests, instead, a fuel transfer from tank to tank or from tank group to tank group, observing the above-described cryotechnical requirement. If a common tank or a common tank group is present for all engines, the transfer may also take place through this tank or tank group. A tank group is defined as a plurality of tanks that belong together, which may have the same or a different design, especially in terms of their volumes.

Evaporation of fuel may also occur at start-up in the transfer lines and shut-off valves according to the present invention, which are located partially outside the tanks. However, the gas bubbles formed are separated or condensed in the next tank, so that this tank also fulfills the task of a gas separator and pressure buffer. Fuel gases as well as fluctuations in pressure and throughput are thus effectively kept away from the intact engines.

The transfer lines originating from the tanks or the tank groups associated with a defined engine or with engines on one side of the airplane, branch off from the feed lines to the engines downstream of the existing tank pumps, still within the respective tank. The transfer lines originate from transfer pumps installed in addition to the tank pumps. The intake areas of at least part of the transfer lines are connected to jet pumps operating according to the ejector principle (ejectors).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
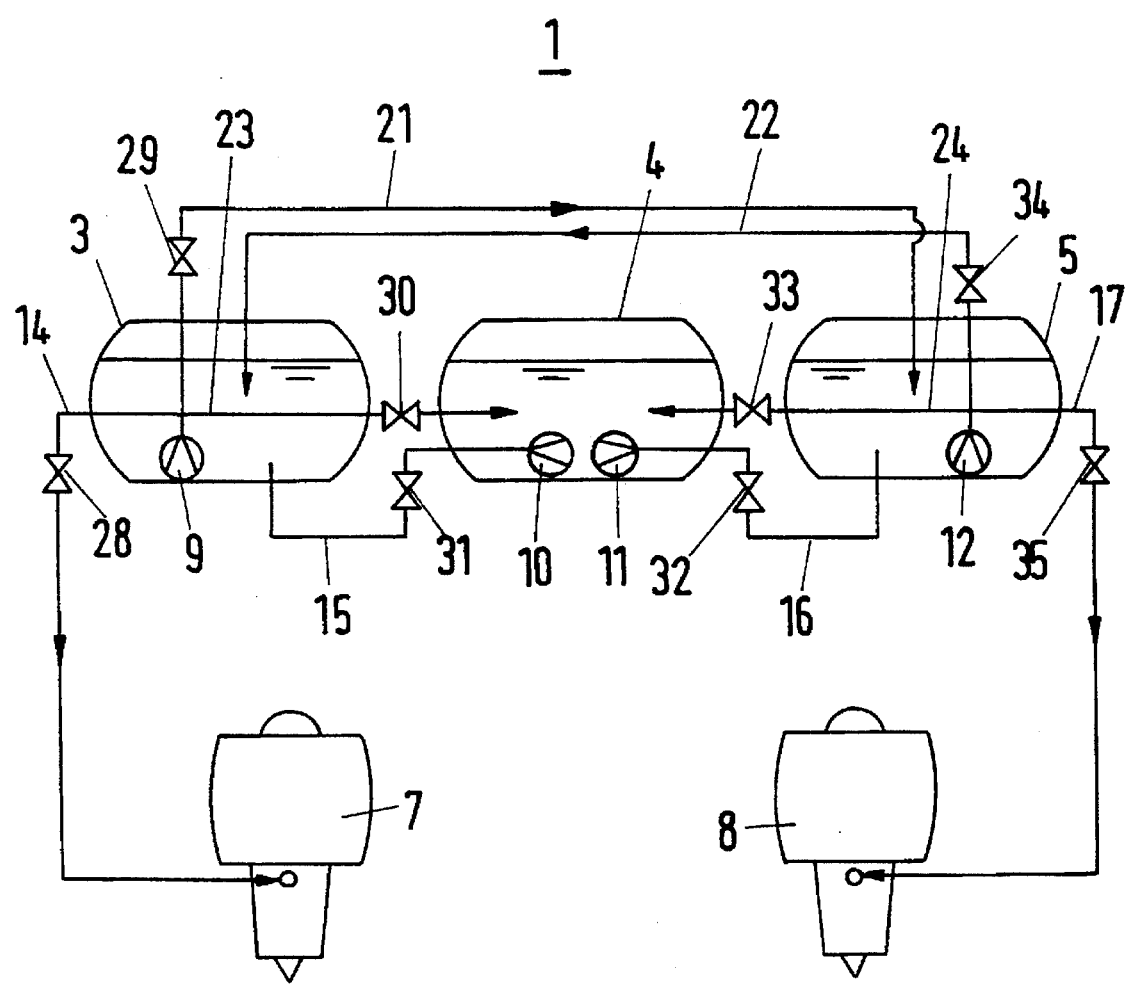
FIG. 1 is a schematic view of a fuel supply system with three tanks for a twin-jet airplane.

The fuel supply system 1 according to the invention is for a twin-jet airplane, e.g., the Airbus A 310, and has a tank 3 for the left-hand engine 7, a tank 5 for the right-hand engine 8, and a common tank 4 for both engines 7 and 8. The fuel is dispensed from the tanks by means of the tank pumps 9, 10, 11 and 12. The feed line 14 from tank 3 is led to the left-hand engine 7, and this line can be opened or closed by means of a shut-off valve 28. The same applies to the feed line 17 as well, which extends to the right-hand engine 8 and is opened or closed by means of the shut-off valve 35. Two transfer lines 15, 16 with shut-off valves 31, 32 lead according to the present invention from the middle tank 4 into the side tanks 3, 5.

Furthermore, a transfer line 21 with a shut-off valve 29 leads from the left-hand tank 3 to the right-hand tank 5, and vice versa, a transfer line 22 with a shut-off valve 34 leads from the latter tank to the left-hand tank 3. Furthermore, two transfer lines 23, 24 with shut-off valves 30, 33 lead from the outer tanks 3, 5 into the middle tank 4. All transfer lines are connected to the tank pumps 9 through 12 necessary for supplying the engines or to the lines originating from the pumps.

When, e.g., the left-hand engine 7 fails or damage (leakage, rupture, clogging, etc.) occurs in its feed line system, the shut-off valve 28 is closed, so that no fuel will be needlessly lost, i.e., without generating thrust. By means of the tank pump 9, the fuel contained in the tank 3 can be pumped directly over into the right-hand tank 5 via the transfer line 21 and/or via the transfer lines 23 and 16 through the middle tank 4 into the right-hand tank 5, for which the shut-off valves 29 or 30 and 32 are to be opened. Thus, the total amount of fuel is available for the still intact engine 8.

Figure 3:
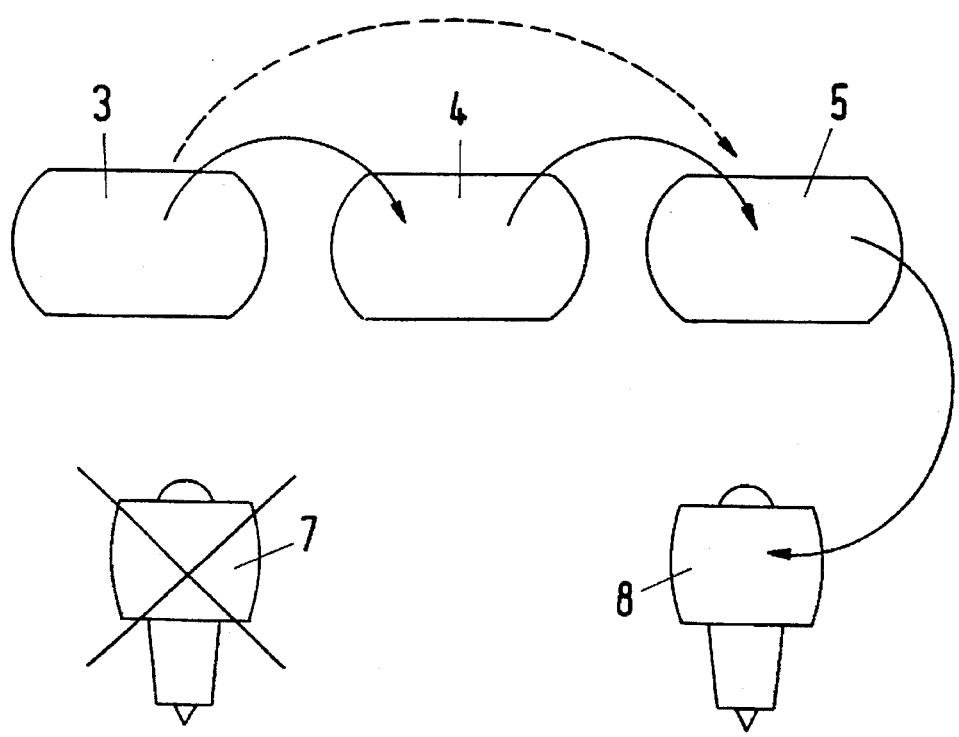
FIG. 3 is a schematic view showing the fuel flow in the case of failure of one engine.

This case is shown in FIG. 3, in which the direct fuel transfer is shown in the form of an arrow drawn in broken line.

Figure 2:
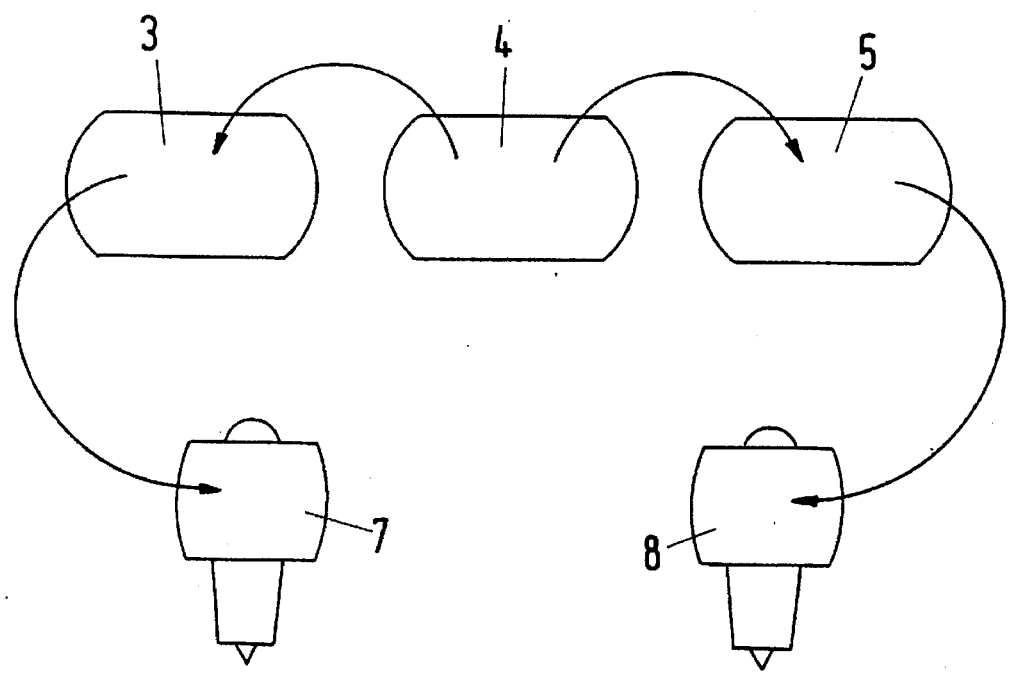
FIG. 2 is a schematic view showing the fuel flow during normal flight operation.

FIG. 2 shows, in contrast, the fuel flow with intact engines and lines.

The supply of auxiliary engines, such as an APU (auxiliary power unit), is left out of consideration in this case.

It is also possible to provide separate transfer pumps for the fuel transfer according to the present invention in addition to the tank pumps. This solution is easily understandable, and therefore, it is not described separately. For example, jet pumps operating according to the ejector principle may be used for this purpose.

Contrary to the "crossover" principle with direct tank/engine fuel transfer, the essence of the present invention is consequently the single or multiple fuel transfer from tank to tank with gas separation and pressure buffering.

As noted above, individual tanks may be replaced with groups of tanks following the principles discussed above. Further, this system may be used for airplanes with multiple engines on each side of a central plane of the airplane.

Figure 4:
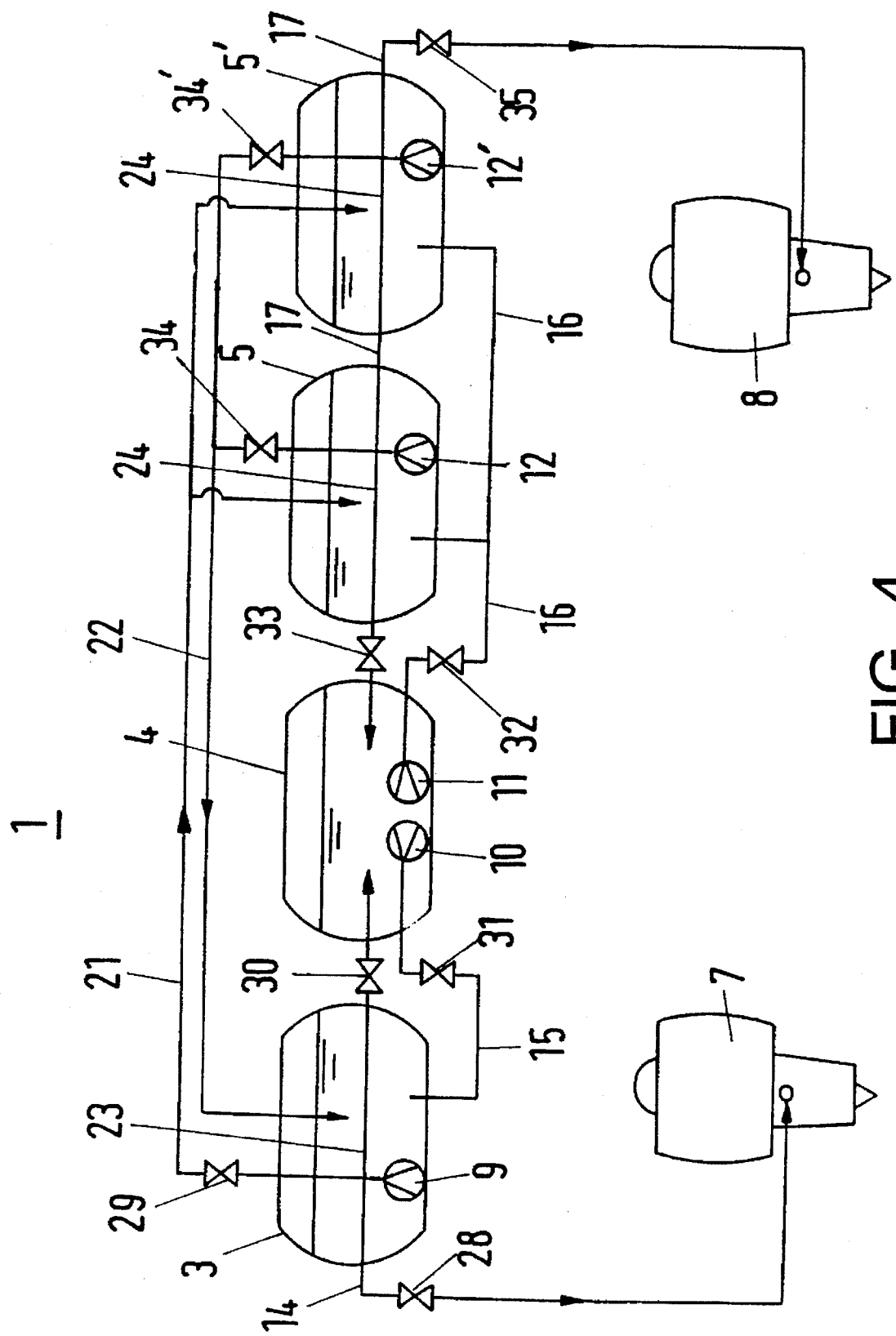
FIG. 4 is a schematic view of the fuel supply system with an additional tank as part of a tank group.

FIG. 4 shows a fuel system similar to FIG. 1 but wherein the right hand tank 5 is connected to a similar tank 5 prime as part of a tank group. The second right hand tank 5 prime is connected to the left hand tank via the transfer line 22 with an additional shut off valve 34'. An additional tank pump 12' is provided in the additional tank 5'. Multiple tanks may be provided on the left side as well (normally a symmetrical design is provided) and the common tank may be provided in the form of multiple tanks forming a common tank group.

While a specific embodiment of the invention has been shown and described in detail to illustrate the application of the principles of the invention, it will be understood that the invention may be embodied otherwise without departing from such principles.

What is claimed is:

1. A fuel supply system for multijet airplanes using cryogenic fuel such as hydrogen, the airplane having an engine on one side of a central plane and having an engine on the other side of the central plane, the system comprising:

a tank on one first side of the longitudinal central plane and a tank on said another side of the longitudinal central plane;

a first transfer line with a shut-off valve leading from said tank on said first side to said tank on said second side;

a common tank for supplying cryogenic fuel to engines both on said first side and on said second side;

an additional first side transfer line with a shut-off valve, said additional first side transfer line leading from said common tank to said tank on said first side; and an additional second side transfer line with a shut-off valve, said additional second side transfer line leading from said common tank to said tank on said second side.

2. A fuel supply system for multijet airplanes using hydrogen as a cryogenic fuel, the airplane having an engine on one side of a central plane and having an engine on the other side of the central plane, the fuel system comprising:

a tank on said first side of the longitudinal central plane and a tank on said second side of the longitudinal central plane;

a first side tank transfer line with a shut-off valve leading from said tank on said first side to said tank on said second side;

a common tank for supplying cryogenic fuel to engines on said first side and said second side;

an additional first side transfer line with a shut-off valve, said additional first side transfer line leading from said common tank to said tank on said first side; and an second side transfer line with a shut-off valve, said second side transfer line leading from said common tank to said tank on said second side.

3. A fuel supply system according to claim 1, wherein said first transfer line branches off from a feed line connecting said tank on said first side to said engine on said first side at a branch off point, downstream of a tank pump on said first side, within said tank on said first side.

4. The fuel supply system according to claim 1, wherein said first transfer line originates from a transfer pump, said transfer pump being provided in addition to tank pumps provided in said common tank.

5. A fuel supply system according to claim 1, wherein an intake area of at least part of said first transfer is connected to a jet ejector pumps.

6. The fuel supply system for multijet airplanes using cryogenic fuel, the airplane having an engine on one side of a central plane and having an engine on the other side of the central plane, the fuel system comprising: a tank on said first side of the longitudinal central plane and a tank on said second side of the longitudinal central plane; a first transfer line with a shut-off valve leading from said tank on said first side to said tank on said second side; a common tank for supplying cryogenic fuel to engines on said first side and said second side; an additional first side transfer line with a shut-off valve, said additional first side transfer line leading from said common tank to said tank on said first side; and an additional second side transfer line with a shut-off valve, said additional second side transfer line leading from said common tank to said tank on said second side.

7. Fuel supply system according to claim 6, wherein at least one of said tank on said first side, said tank on said second side and said common tank are connected to a similar tank as part of a tank group.

8. The fuel supply system according to claim 2, further comprising: a second side additional transfer line with a shut-off valve leading from said tank on said second side to said tank on said first side.

* * * * *